United States Patent Office 3,514,496
Patented May 26, 1970

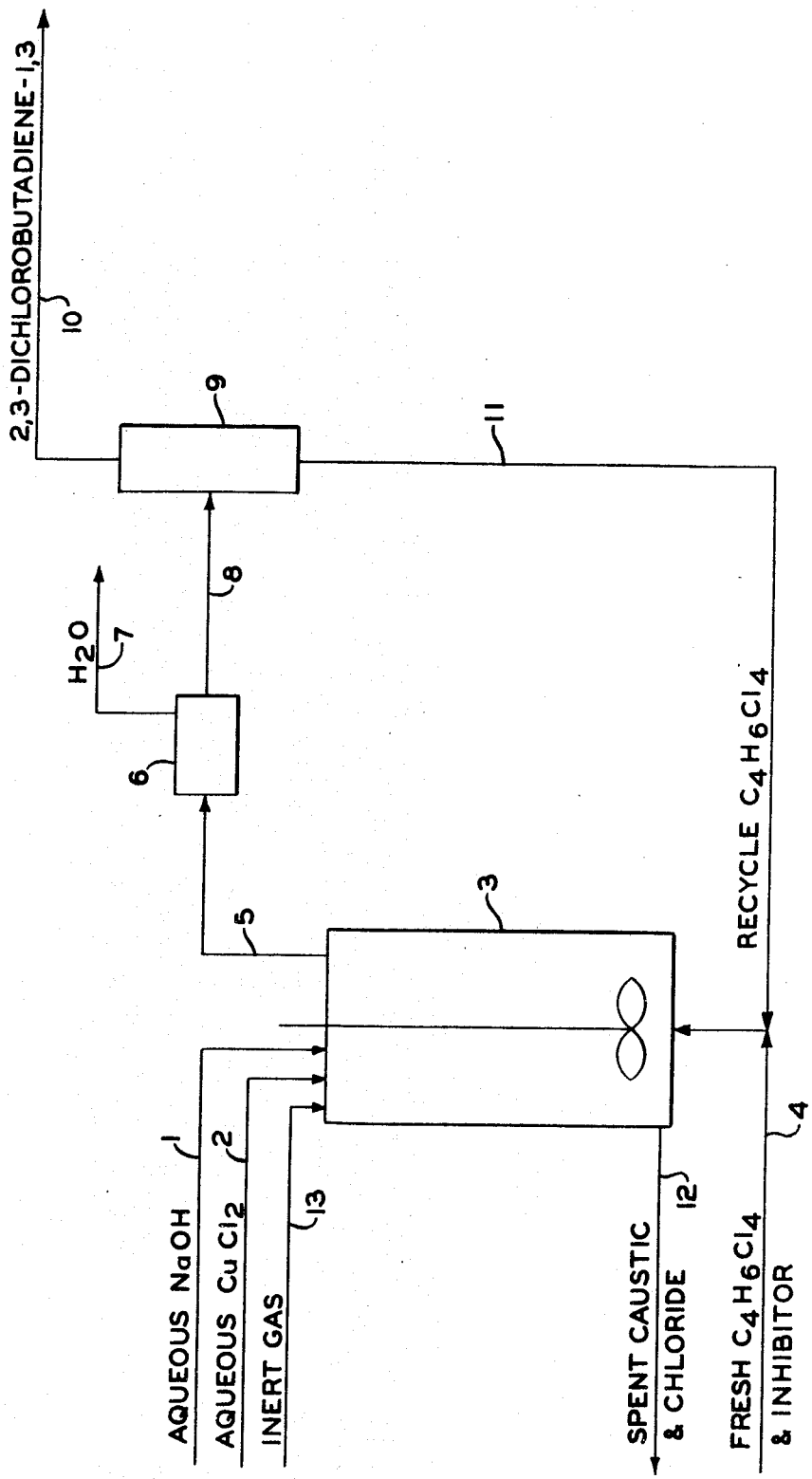

---

3,514,496
2,3-DICHLOROBUTADIENE-1,3 PROCESS
Jean M. Mallan, also known as Jean M. Lomaz, and Edward L. Kay, Akron, Ohio, assignors to The Firestone Tire & Rubber Company, Akron, Ohio, a corporation of Ohio
Filed Sept. 18, 1967, Ser. No. 668,441
Int. Cl. C07c *21/20*
U.S. Cl. 260—655   9 Claims

ABSTRACT OF THE DISCLOSURE 2,3-dichlorobutadiene-1,3 is produced by reacting meso-1,2,3,4-tetrachlorobutane in molten form with aqueous caustic containing a small amount of cupric chloride or other cupric salt.

The process is usually carried out on a continuous basis, but may be carried out batchwise.

---

This invention relates to an improved process for the production of 2,3-dichlorobutadiene-1,3 by dehydrochlorination of meso - 1,2,3,4 - tetrachlorobutane in aqueous alkali containing a small amount of cupric salt. The product is obtained in higher yield and is of higher purity than the product produced by dehydrochloroination of tetrachlorobutane in aqueous alkali in the absence of a cupric salt.

In the improved process for the production of 2,3-dichlorobutadiene-1,3, the meso-1,2,3,4-tetrachlorobutane in molten form is brought into contact with hot aqueous caustic in the presence of cupric chloride or other cupric salt. The 2,3-dichlorobutadiene-1,3 is distilled from the reaction mixture and recovered in any usual way, as by condensation.

The function of the cupric chloride in the process is not fully understood. In the absence of the cupric chloride, a large amount of the tetrachlorobutane is volatilized and recovered with the desired 2,3-dichlorobutadiene-1,3. However, with the cupric chloride present in small amount, the yield of the 2,3-dichlorobutadiene-1,3 and its purity are unexpectedly and materially improved. It is, therefore, thought that the cupric chloride increases the solubility of the tetrachlorobutane in the aqueous caustic thus allowing better contact between the reactants. The caustic removes hydrogen chloride from the tetrachlorobutane according to the following chemical equation:

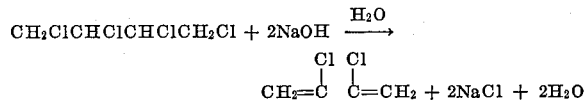

With the cupric chloride present, the yield and purity is significantly higher than if the reaction were conducted in the absence of the cupric chloride. Assuming that the function of the cupric chloride is to improve the solubility of the tetrachlorobutane, it is immaterial whether it is present in the aqueous caustic or in the tetrachlorobutane, or added separately. By increasing its solubility the tetrachlorobutane has longer contact time with the caustic and therefore more dichlorobutadiene is formed.

The tetrachlorobutane employed is meso-1,2,3,4-tetrachlorobutane, and not dl-1,2,3,4-tetrachlorobutane. The dehydrohalogenation of dl-1,2,3,4-tetrachlorobutane does not give a high yield of 2,3-dichlorobutadiene-1,3. Meso-1,2,3,4-tetrachlorobutane of at least 99 percent purity is preferred, although material of less purity and containing some dl-1,2,3,4-tetrachlorobutane may be used.

For removal of two moles of hydrogen chloride from tetrachlorobutane, any strongly alkaline reagent may be used. Ordinarily, sodium hydroxide will be employed. Other alkaline reagents which are commerically available at low cost such as potassium hydroxide and calcium hydroxide may be used, but other alkaline reagents may also be employed. The pH of the solution should be at least substantially 12, and might be as much as 14. The usual caustic solution contains 20 parts by weight (0.5 mole) of sodium hydroxide per 100 parts by weight of water.

Although cupric chloride will ordinarily be employed, other water-soluble cupric salts may be used such as cupric bromide, sulfate, nitrates, etc.

The operation can be carried out in conventional equipment, in a batchwise manner or on a continuous basis. For batch operation, the molten tetrachlorobutane is charged to a reaction vessel containing aqueous caustic and the cupric chloride or other cupric salt. The reaction vessel is provided with a stirrer and vapor outlet, the vapor outlet usually being provided with a condenser for the condensation and recovery of the dichlorobutadiene product. The reaction medium is maintained between about 95° C. and the boiling point of the reaction medium. The molten tetrachlorobutane, maintained at a temperature of about 70° C., just sufficient to keep it molten, is added continuously. The apparatus is swept out with an inert gas, usually nitrogen, to reduce the dwell time of the 2,3-dichlorobutadiene-1,3 formed in the reaction and to minimize polymerization of the product. It is usual to include a polymerization inhibitor either in the tetrachlorobutane or in the aqueous bath. Phenothiazine, phenyl-beta-naphthylamine, hindered phenols, and other well known polymerization inhibitors may be employed.

The reaction can be satisfactorily carried out at atmospheric pressure, but pressures above or below atmospheric may be employed.

EXAMPLE 1

A 3-necked, 500 ml. flask with a thermometer well was fitted with a mechanical stirrer, a thermometer, a heated addition funnel and a goose-neck used as a condenser. A wet ice-cooled receiver was attached to the goose-neck and two Dry-Ice traps were connected in series to the goose-neck outlet tube. The addition funnel was heated by means of a heating tape and was equipped with a dip tube which extended below the surface of the reaction medium. An inlet for nitrogen was provided below the stopcock at the bottom of the addition funnel so that nitrogen could be passed over the reaction medium.

Approximately 200 ml. of water containing 40 grams (1.0 mole) of sodium hydroxide and 1 gram of a phenothiazine inhibitor were placed in the flask and the contents heated to boiling. Thirty grams of meso-1,2,3,4-tetrachlorobutane were placed in the addition funnel which was then heated until the compound melted. A slow stream of nitrogen flowed through the system at all times. The molten tetrachlorobutane was then added to the stirred, hot caustic solution. The caustic solution was held at about 100° C. Dichlorobutadiene distilled out as a dense fog as soon as it was formed and it was quickly recovered as condensate in a wet ice-cooled receiver and two traps cooled by Dry Ice (frozen $CO_2$). Heating was continued for 30 minutes after the obvious distillation of 2,3-dichlorobutadiene-1,3 was complete. The condensate collected in the units of the condensing system was combined, dried over calcium chloride and analyzed by gas chromatography.

In the accompanying table the details and results of representative experiments have been recorded. In Runs A and B, water alone was used, and in Runs C and D, one gram of cupric chloride per 200 ml. of the aqueous caustic solution was added.

TABLE

| Run | Rate of add'n, g./min. | Temp., °C. | Grams in organic layer | Percent DCB | Percent TCB | Percent yield DCB |
|---|---|---|---|---|---|---|
| A | 30/10 | 97 | 13.7 | 52 | 40 | 38 |
| B | 30/5 | 98 | 14.9 | 52 | 38 | 41 |
| C | 30/4 | 97 | 14.8 | 64 | 26 | 51 |
| D | 30/4 | 100 | 15.6 | 66 | 21 | 55 |

The rate of addition of the meso-1,2,3,4-tetrachlorobutane in the runs which contained no cupric salt varied from 30 grams in 10 minutes to 30 grams in 5 minutes. Because a higher yield was obtained in the shorter period, 4 minutes was used in Runs C and D.

The fourth column of the table records the weight in grams of organic products which were recovered from the condensate receivers. The next two columns record the weight percent of 2,3-dichlorobutadiene-1,3 (DCB) and unreacted meso-1,2,3,4-tetrachlorobutane (TCB), respectively, in the grams of organic material isolated. The percent yield of 2,3-dichlorobutadiene-1,3 is given in the last column, based on the amount of meso-1,2,3,4-tetrachlorobutane used in the experiment.

Referring to the drawing, which is a flow sheet for the continuous process, aqueous sodium hydroxide and aqueous cupric chloride are charged through lines 1 and 2, respectively, into a stirred reactor 3. Substantially 20 parts by weight of sodium hydroxide and substantially 1 part by weight of cupric chloride are used per 100 parts by weight of water. The reactor is heated to the desired temperature as specified previously and fresh meso-1,2,3,4-tetrachlorobutane containing polymerization inhibitor is charged to the reactor through line 4. A mixture of water, 2,3-dichlorobutadiene-1,3 and meso-1,2,3,4-tetrachlorobutane is distilled through line 5 and the mixture condensed by cooling in vessel 6. Water is removed through line 7 and discarded. A fluid mixture of 2,3-dichlorobutadiene-1,3 and meso-1,2,3,4-tetrachlorobutane is charged through line 8 to distillation column 9 where 2,3-dichlorobutadiene-1,3 is removed overhead, condensed by cooling and sent to storage through line 10. Meso-1,2,3,4-tetrachlorobutane is removed as a liquid from the bottom of distillation column 9 and recycled back to reactor 3 through line 11. Spent caustic solution is removed from reactor 3 through line 12. The pH of the reaction mixture is maintained by controlling the amount of aqueous caustic charged through line 1 and the amount of spent caustic withdrawn through line 12. The system is advantageously purged with nitrogen or other inert gas introduced through line 13. Many variations from the preceding description of a continuous system are possible without departing from the scope of our invention.

We claim: :

1. The method of producing 2,3-dichlorobutadiene-1,3 by dehydrohalogenation of meso-1,2,3,4-tetrachlorobutane which method comprises reacting the meso-1,2,3,4-tetrachlorobutane with aqueous caustic of a pH of at least 12 at a temperature just above the boiling point of the 2,3-dichlorobutadiene-1,3 in the presence of a small amount of a cupric salt selected from the group consisting of cupric chloride, cupric bromide, cupric sulfate and cupric nitrate.

2. The process of claim 1 in which the process is carried out batchwise and the vapors evolved in the reaction are removed from the reaction zone by a stream of inert gas and quickly cooled.

3. The process of claim 1 wherein the cupric salt is cupric chloride.

4. The process of claim 2 in which one part by weight of cupric chloride is used per 100 parts by weight of caustic solution.

5. The process of claim 1 in which the caustic is sodium hydroxide.

6. The process of claim 5 in which 20 parts by weight of sodium hydroxide is used per 100 parts by weight of water.

7. The process of claim 1 which is a continuous process in which substantially 20 parts by weight of sodium hydroxide and substantially one part by weight of cupric chloride are used per 100 parts by weight of water and vapors generated in the reaction are swept from the reaction zone by an inert gas and quickly condensed.

8. The process of claim 1 which is carried out as a batch process.

9. The process of claim 1 which is carried out as a continuous process.

References Cited

UNITED STATES PATENTS 2,626,964   1/1953   Eberly et al. _____ 260—655

FOREIGN PATENTS 825,609   12/1959   Great Britain.

LEON ZITVER, Primary Examiner

J. A. BOSKA, Assistant Examiner

UNITED STATES PATENT OFFICE
CERTIFICATE OF CORRECTION

Patent No. 3,514,496      Dated May 26, 1970

Inventor(s) JEAN M. MALLAN, also known as JEAN M. LOMAZ, and EDWARD L. KAY

It is certified that error appears in the above-identified patent and that said Letters Patent are hereby corrected as shown below:

Col. 1, lines 51-52 should read as follows:

$$CH_2 = \underset{\underset{Cl}{|}}{C} - \underset{\underset{Cl}{|}}{C} = CH_2 + 2NaCl + 2H_2O$$

Col. 2, line 15, "nitrates" should read --nitrate--

SIGNED AND
SEALED
SEP 15 1970

(SEAL)
Attest:

Edward M. Fletcher, Jr.
Attesting Officer

WILLIAM E. SCHUYLER, JR.
Commissioner of Patents